Jan. 9, 1923.

B. F. GRAVES.
DRAFT HITCH.
FILED NOV. 25, 1921.

1,441,223

2 SHEETS-SHEET 1

B. F. Graves,
Inventor.

By C. A. Snow & Co.
Attorneys

Jan. 9, 1923.
B. F. GRAVES.
DRAFT HITCH.
FILED NOV. 25, 1921.
1,441,223
2 SHEETS-SHEET 2
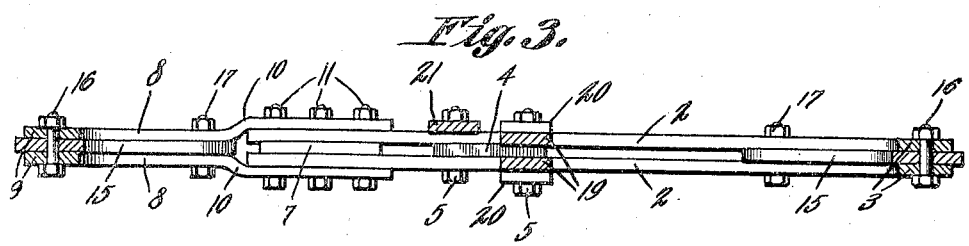
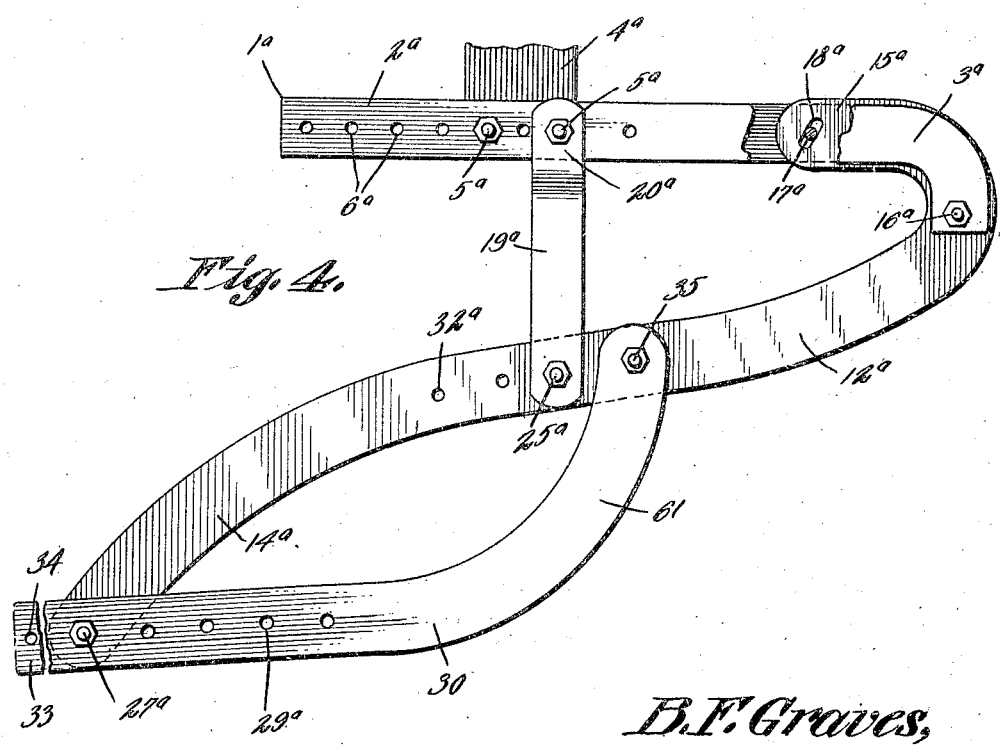
B. F. Graves,
Inventor, Patented Jan. 9, 1923.

1,441,223

UNITED STATES PATENT OFFICE.

BENJAMIN F. GRAVES, OF ROHERSVILLE, MARYLAND.

DRAFT HITCH.

Application filed November 25, 1921. Serial No. 517,711.

*To all whom it may concern:*

Be it known that I, BENJAMIN F. GRAVES, a citizen of the United States, residing at Rohersville, in the county of Washington and State of Maryland, have invented a new and useful Draft Hitch, of which the following is a specification.

The device forming the subject matter of this application is a draft hitch, adapted to be mounted on the tongue of a tractor, or the like, for the attachment of plows, harvesters, drags, or anything else which requires to be drawn along. The invention aims to provide a device of the sort mentioned which will reduce and avoid side draft, it being possible to locate the plow or other element which is drawn, at adjusted distances from the line of draft.

I do not bind myself to the particular forms shown and described, since a mechanic, exercising the skill which might be expected of him, and working within the scope of what is claimed, may make changes in the forms selected as illustrations of the invention without departing from the spirit of the invention.

Figure 1:
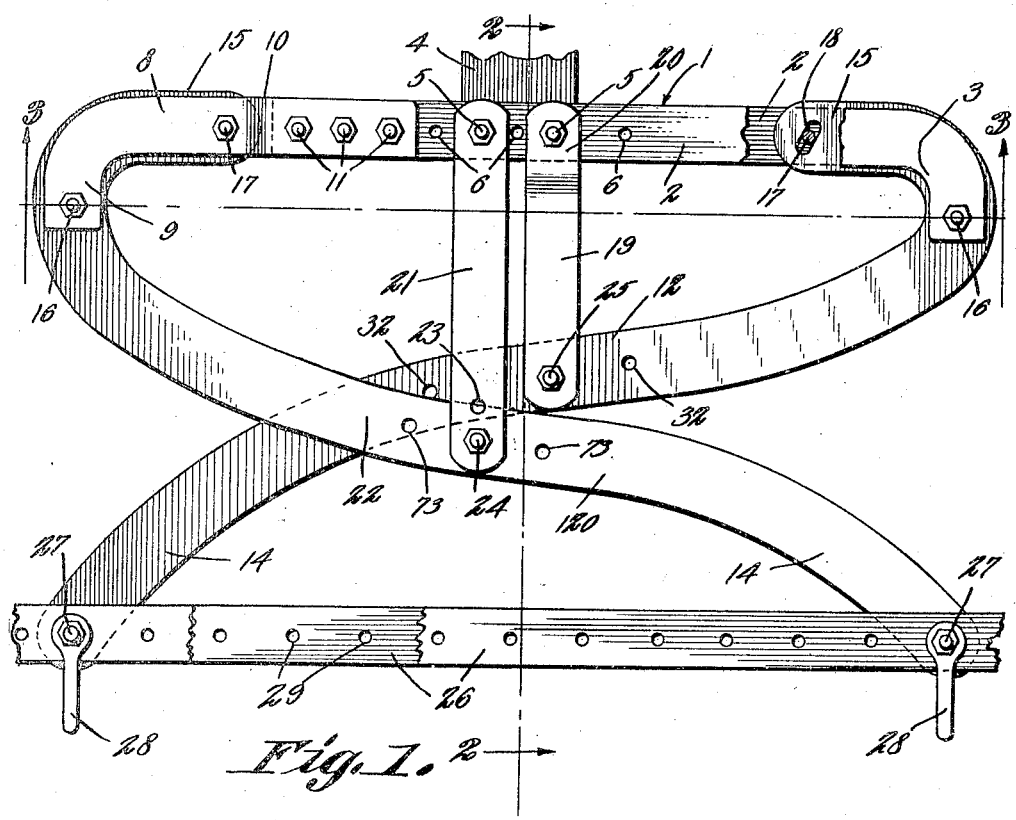
Figure 2:
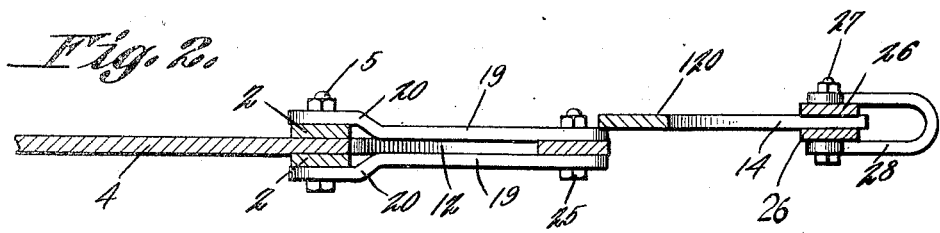

In the drawings:—Figure 1 shows in top plan, a device constructed in accordance with the invention; Figure 2 is a section on the line 2—2 of Figure 1; Figure 3 is a section on the line 3—3 of Figure 1; Figure 4 is a plan disclosing a modification.

Referring to Figures 1, 2 and 3, there is provided a main member 1 embodying bars 2 located one above the other, the bars having rearwardly extended ends 3. A draft tongue 4, which may be part of a tractor, extends between the bars 2. The bars 2 have any desired number of openings 6 adapted to receive securing elements 5 whereby the bars are attached to the tongue 4. A spacer 7 is interposed between the bars 2 at one end thereof. Supplemental bars 8 are provided and include rearwardly extended ends 9, corresponding to the parts 3, the inner ends 10 of the bars 8 being spread to receive the corresponding ends of the bars 2. Securing devices 11 connect the bars 8 and 2 and pass through the spacer 7, the securing devices being mounted in certain of the openings 6 of the bars 2.

Reversely curved auxiliary members 12 and 120 are provided, and are crossed upon each other, intermediate their ends, as shown at 22. The member 12 is provided intermediate its ends with openings 32. Each of the members 12 and 120 includes a rearwardly extended, outwardly inclined part 14. At their forward ends, the members 12 and 120 have inwardly extended arms 15, projecting toward each other, and disposed approximately at right angles to the draft line. One arm 15 extends between the ends 9 of the bars 8. The other arm 15 extends between the ends 3 of the bars 2. The members 12 and 120 are mounted to swing, for adjustment, on pivot elements 16 mounted in the ends 9 of the bars 8 and in the ends 3 of the bars 2. Securing elements 17 are located in the bars 2 and 8, and are received in diagonal arcuate slots fashioned in the arms 15 of the bars 12 and 120.

A pair of links 19 is provided, the links being located one above the other. The forward ends of the links, denoted by the numeral 20, are spread to receive the bars 2 and are mounted on certain of the securing elements 5. A link 21 is provided, the forward end of the link being mounted on one of the securing elements 5. The link 21 has openings 23 in any of which may be mounted a connecting element 24 engaged with the auxiliary member 120. A connecting element 25, adapted to be mounted in any of the openings 32 of the member 12, carries the rear ends of the links 19. The bar 120 has any desired number of openings 73 for the reception of the connecting element 24. Should an adjustment be desired, the connecting element 25 may be mounted in any of the openings 32, the connecting element 24 can be mounted in any of the openings 73, the securing elements 5 being shifted in the openings 6. When this adjustment is made, the auxiliary members 12 swing on the pivot elements 16, a lost motion connection being afforded, owing to the presence of the securing elements 17 and the slots 18.

Transverse bars 26 are provided, and have any desired number of openings 29, permitting the plow or other object which is to be drawn, to be attached to the bars, through the medium of clevises or the like. Bolts 27 connect the bars 26 with the parts 14 of the members 12 and 120, and carry clevises 28.

The construction is such that the implement which is to be drawn may be disposed on either side of the draft line, at spaced points, or at adjusted positions between said points, since the transverse bars 26 are provided with the openings 29. Proper adjustment is afforded for connecting the device to tractor tongues of different makes and widths.

In the modification depicted in Figure 4, parts hereinbefore described have been designated by numerals previously used, with the suffix "a." The following parts, embodied in the form delineated in Figure 1, are omitted in the form shown in Figure 4; the transverse bar 26, the auxiliary member 120, the supplemental bars 8 and the link 21. A transverse bar 30 is provided and has a forwardly curved end 61, connected with the auxiliary member 12 by a securing device 35 adapted to be mounted in one of the openings $32^a$. The bar 30 is connected to the rear end of the part $14^a$ of the auxiliary member $12^a$ by a bolt $27^a$. The bar 30 may be extended any desired distance, as shown at 33, beyond the part $14^a$, and may be supplied with one or more openings 34, adapted to receive a clevis or the like. The structure shown in Figure 4 is adapted to be used when it is desired that the plow, harvester, drag or the like shall be located farther to one side of the draft line than is possible when the form shown in Figure 1 is used.

Briefly considered, the device includes a main member $1-1^a$ having a rearwardly extended end $3-3^a$; an auxiliary member $12-12^a$ disposed at an angle to the main member and pivoted at $16-16^a$, intermediate its ends, to the main member, the auxiliary member being curved to form a forward end portion $3-3^a$ overlapped on the main member; a lost motion connection $18-17-18^a-17^a$ between the forward end portion of the auxiliary member and the main member; a link $19-19^a$ pivoted at $25-25^a$ to the intermediate portion of the auxiliary member; means $5-6-5^a-6^a$ for connecting the link to the main member at spaced points longitudinally of said member; and a cross bar $26-30$ disposed transversely of the draft line and connected to the auxiliary member $12-12^a$.

I claim:—

1. In a device of the class described, a main member having a rearwardly extended end; an auxiliary member disposed at an angle to the main member and pivoted intermediate its ends to the main member, the auxiliary member being curved to form a forward end portion overlapped on the main member; a lost motion connection between the forward end portion of the auxiliary member and the main member; a link pivoted to the intermediate portion of the auxiliary member; and means for connecting the link to the main member at spaced points longitudinally of said member.

2. A device of the class described, constructed as set forth in claim 1 and further characterized by the provision of a cross bar disposed transversely of the draft line and connected to the auxiliary member.

In testimony that I claim the foregoing as my own, I have hereto affixed my signature in the presence of a witness.

BENJAMIN F. GRAVES.

Witness:
Ivy E. Simpson.